United States Patent
Wang et al.

(10) Patent No.: US 10,050,573 B2
(45) Date of Patent: Aug. 14, 2018

(54) WIND POWER GENERATION SYSTEM INCLUDING DOUBLY-FED GENERATOR AND STATOR-CONNECTED AUXILIARY CONVERTER

(71) Applicant: DELTA ELECTRONICS, INC., Taoyuan (TW)

(72) Inventors: Chang-Yong Wang, Taoyuan (TW); Fei Lu, Taoyuan (TW); Hai-Fen Xue, Taoyuan (TW); Li Chen, Taoyuan (TW); Liang Cao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 106 days.

(21) Appl. No.: 15/068,659

(22) Filed: Mar. 14, 2016

(65) Prior Publication Data
US 2016/0285399 A1 Sep. 29, 2016

(30) Foreign Application Priority Data

Mar. 24, 2015 (CN) .......................... 2015 1 0130431

(51) Int. Cl.
*H02P 9/00* (2006.01)
*F03D 7/02* (2006.01)
*F03D 9/25* (2016.01)

(52) U.S. Cl.
CPC .......... *H02P 9/007* (2013.01); *F03D 7/0272* (2013.01); *F03D 9/255* (2017.02);
(Continued)

(58) Field of Classification Search
CPC .... F03D 7/0272; F03D 9/255; F05B 2270/32; H02P 9/007; Y02E 10/723; Y02E 10/725
See application file for complete search history.

(56) References Cited

U.S. PATENT DOCUMENTS 7,391,126 B2 * 6/2008 Liu ........................... F03D 7/00
290/44
7,514,809 B2 * 4/2009 Edenfeld ................. H02M 5/00
290/44
(Continued)

FOREIGN PATENT DOCUMENTS

CN 202503304 U * 10/2012
CN 102797637 A 11/2012
(Continued)

*Primary Examiner* — Tulsidas C Patel
*Assistant Examiner* — S. Mikailoff
(74) *Attorney, Agent, or Firm* — CKC & Partners Co., Ltd.

(57) ABSTRACT

A wind power generation system and a control method thereof are provided herein. The wind power generation system includes a doubly-fed generator, a generator-side converter, a grid-side converter and an auxiliary converter. The doubly fed generator includes a stator winding and a rotor winding. The stator winding is coupled to a grid. The generator-side converter is coupled to the rotor winding. The grid-side converter is coupled between the generator-side converter and the grid. The auxiliary converter includes a first side and a second side. The first side is coupled to the stator winding. The second side is coupled between the generator-side converter and the grid-side converter. The generator-side converter, the grid-side converter and the auxiliary converter use the same DC bus.

16 Claims, 14 Drawing Sheets

(52) U.S. Cl.
CPC ......... *F05B 2270/32* (2013.01); *Y02E 10/723* (2013.01); *Y02E 10/725* (2013.01)

(56) References Cited

U.S. PATENT DOCUMENTS

| | | | | |
|---|---|---|---|---|
| 7,952,232 | B2* | 5/2011 | Burra | H02J 9/062 |
| | | | | 290/44 |
| 8,577,508 | B2 | 11/2013 | Li et al. | |
| 2008/0296898 | A1* | 12/2008 | Ichinose | H02P 9/10 |
| | | | | 290/44 |
| 2009/0230689 | A1* | 9/2009 | Burra | H02J 9/062 |
| | | | | 290/55 |
| 2011/0057446 | A1* | 3/2011 | Mayor Lusarreta | H02J 3/386 |
| | | | | 290/44 |
| 2012/0217824 | A1* | 8/2012 | Gupta | F03D 7/0272 |
| | | | | 307/145 |
| 2013/0049707 | A1* | 2/2013 | Wang | H02P 6/00 |
| | | | | 322/21 |
| 2013/0200619 | A1* | 8/2013 | Sole Lopez | H02P 9/007 |
| | | | | 290/44 |
| 2013/0265806 | A1* | 10/2013 | Wang | H02J 3/24 |
| | | | | 363/37 |
| 2015/0001848 | A1* | 1/2015 | Imaie | H02P 9/006 |
| | | | | 290/44 |

FOREIGN PATENT DOCUMENTS

| | | | |
|---|---|---|---|
| CN | 103138669 | A | 6/2013 |
| CN | 104269884 | A | 1/2015 |
| JP | 2008301584 | A | 12/2008 |

\* cited by examiner

WIND POWER GENERATION SYSTEM INCLUDING DOUBLY-FED GENERATOR AND STATOR-CONNECTED AUXILIARY CONVERTER

RELATED APPLICATIONS

This application claims priority to China Application Serial Number 201510130431.4, filed Mar. 24, 2015, which is herein incorporated by reference.

BACKGROUND

Field of Disclosure

The present disclosure relates to a wind power generation system. More particularly, the present disclosure relates to a doubly-fed wind power generation system.

Description of Related Art

In recent years, the wind power generation technology uses the electronic converter (such as the alternating-current/direct-current/alternating-current converter in combination with a high level control system) such that the grid frequency and the mechanical rotor frequency can be decoupled. The wind power generator module can therefore be operated under variable speed. As a result, the improvement of the variable speed wind power generator module is obvious in recent years.

Mega-watts wind power generation systems can be categorized into full power wind power generation systems and doubly-fed wind power generation systems. The full power wind power generation systems mainly include the full power wind power generator modules having a full power generator and full power converters. Reference now made to FIG. 1, FIG. 1 is a diagram of a conventional full power wind power generation system 100. The full power wind power generation system 100 includes a fan 110, a full power generator 120, a generator-side converter 130, a grid-side converter 140 and a direct current (DC) bus 150. The fan 110 is coupled to the full power generator 120. A stator winding 121 of the full power generator 120 is coupled to the generator-side converter 130 through a switch SW1. The generator-side converter 130 and the grid-side converter 140 use the same DC bus 150. The grid-side converter 140 is coupled to the grid 160 through a switch SW2.

By using paddles 111, the fan 110 converts the wind energy to a mechanical torque (rotational inertia of paddles). The full power generator 120 converts the mechanical torque to the electric energy. The electric energy outputted by the full power generator 120 is transmitted to the grid 160 through the conversion of the generator-side converter 130 and the grid-side converter 140. In the full power wind power generation system 100, the generator-side converter 130 and the grid-side converter 140 are full power converters. In other words, the generator-side converter 130 and the grid-side converter 140 process all the outputted power. The full power generator 120 can be a permanent-magnet synchronous generator, an electric excitation generator or an induction generator and so on. In another conventional embodiment, the fan 100 can be coupled to the generator 120 through a gear box (not illustrated). The gear box can turn a low rotation speed of the paddles to a high rotation speed of the generator.

The advantages of the full power generator modules include wide operation range of power generation, low cut-in wind speed and great adaptability to the grid. However, since the cost of the full power generator and the full power converter is high (the generator-side converter 130 and the grid-side converter 140 use the converter of large capacity), the manufacturing cost of the full power generator module is high.

Besides, the doubly-fed wind power generation systems mainly include doubly-fed wind power generation modules that have a doubly-fed induction generator and doubly-fed converters. The advantage of the doubly-fed wind power generation modules includes the low cost of the equipments that is much lower than that of the full power generator modules. However, the disadvantage of the doubly-fed wind power generation modules includes the low efficiency of the power generation under a low wind speed, a greater loss under the low rotation speed and the limited voltage endurance of the electronic components in the converters due to the range of the rotation speed of the generator that results in a limited operation range.

Accordingly, what is needed is a wind power generation system that has a high efficiency and a high cost-performance.

SUMMARY

An aspect of the present disclosure is to provide a wind power generation system. The wind power generation system includes a doubly-fed generator, a generator-side converter, a grid-side converter and an auxiliary converter. The doubly-fed generator includes a stator winding coupled to a grid and a rotor winding. The generator-side converter is coupled to the rotor winding. The grid-side converter is coupled between the generator-side converter and the grid. The auxiliary converter includes a first side coupled to the stator winding and a second side coupled between the generator-side converter and the grid-side converter. The generator-side converter, the grid-side converter and the auxiliary converter use the same DC bus.

Another aspect of the present disclosure is to provide a control method used in the wind power generation system. The control method includes the steps outlined below. The wind power generation system is controlled to be operated in a full power generation mode when a wind speed is smaller than a predetermined wind speed. The wind power generation system is controlled to be operated in a doubly-fed power generation mode when the wind speed is larger than the predetermined wind speed.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present invention. Moreover, the operation of the described structure is not for limiting the order of implementation. Any device with equivalent functions that is produced from a structure formed by a recombination of elements is all covered by the scope of the invention. Drawings are for the purpose of illustration only, and not plotted in accordance with the original size.

As used herein, the terms "first", "second" and the like, etc., are used to describe various elements, components, regions, layers and/or blocks can be understood. However, these elements, components, regions, layers and/or blocks should not be limited by these terms. The terms are used to identify a single element. Therefore, in the following a first element, component, region, layer, and/or blocks may also be termed a second element, component, region, layer, and/or blocks, without departing from the intent of the present invention.

It will be understood that when an element is referred to as being "connected to" or "coupled to", it can be directly connected or coupled to the other element or intervening elements may be present. In contrast, when an element to another element is referred to as being "directly connected" or "directly coupled," there are no intervening elements present. As used herein, the term "and/or" includes an associated listed items or any and all combinations of more.

Figure 1:
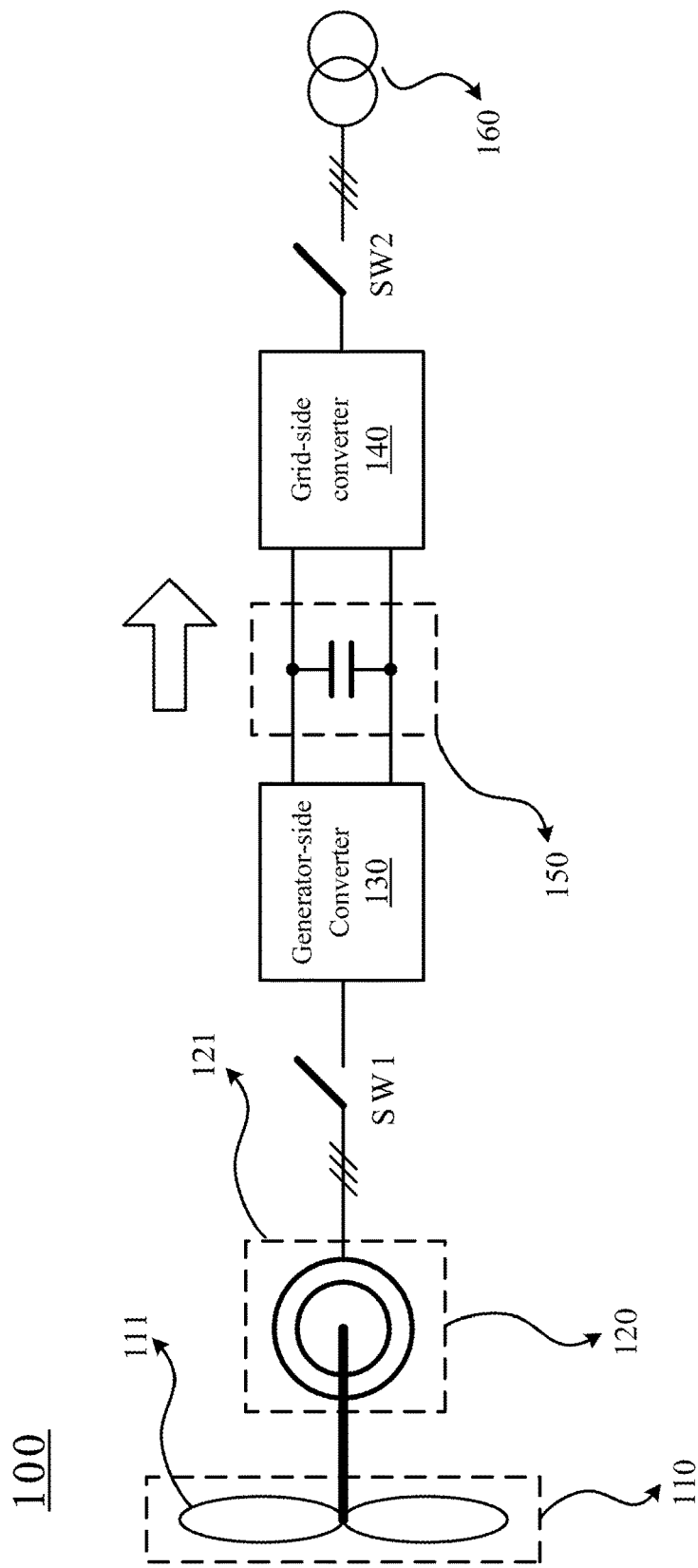
FIG. 1 is a diagram of a conventional full power wind power generation system.
Figure 2:
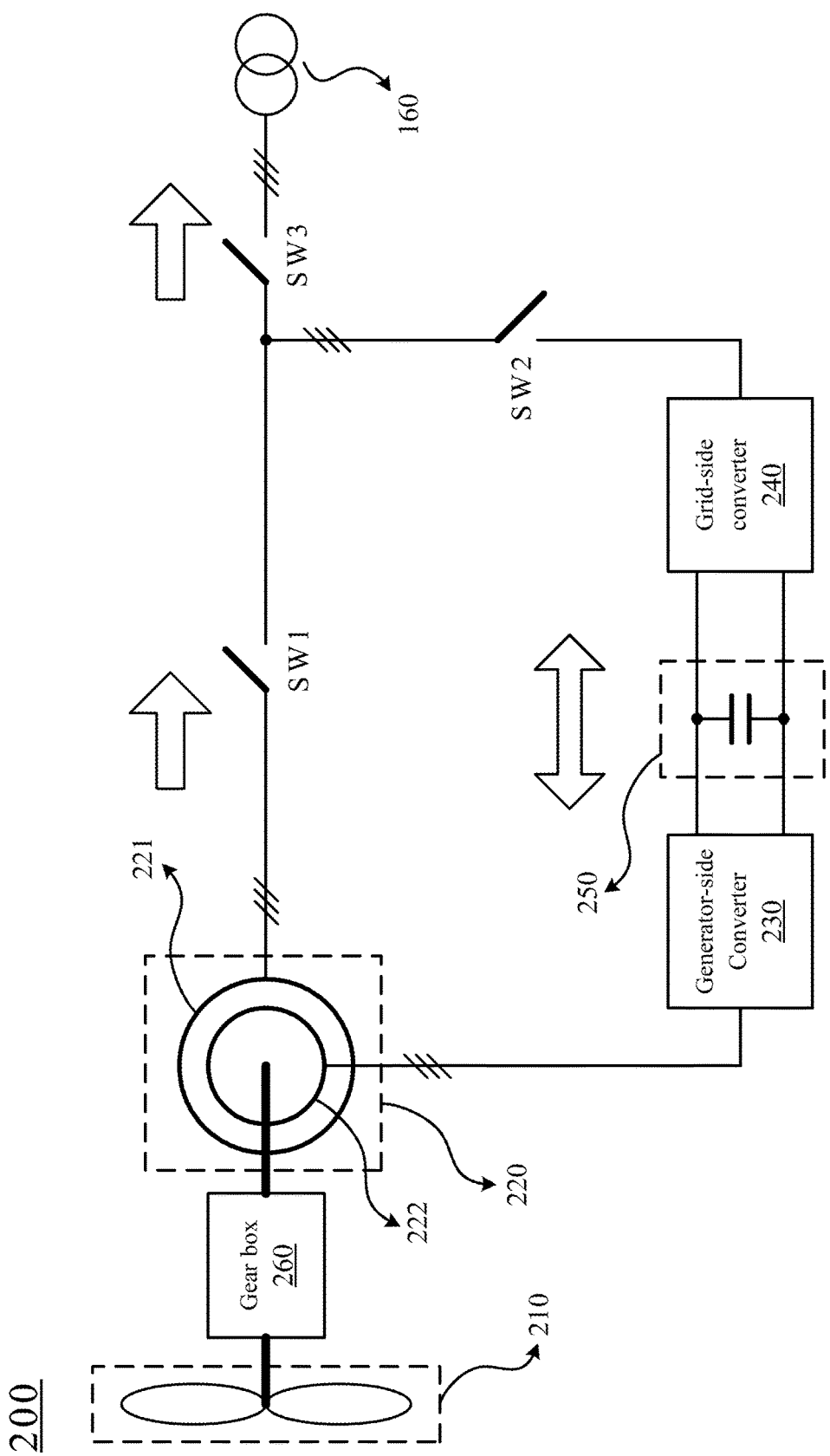
FIG. 2 is a diagram of a wind power generation system in an embodiment of the present disclosure.

FIG. 2 is a diagram of a wind power generation system 200 in an embodiment of the present disclosure. The wind power generation system 200 includes a fan 210, a doubly-fed generator 220, a generator-side converter 230, a grid-side converter 240, a direct current (DC) bus 250 and a gear box 260. In the present embodiment, the fan 210 is coupled to the doubly-fed generator 220 through the gear box 260. The doubly-fed generator 220 includes a stator winding 221 and a rotor winding 222. The stator winding 221 of the doubly-fed generator 220 is coupled to a grid 160 through a switch SW1 and a switch SW3. The rotor winding 222 of the doubly-fed generator 220 is coupled to the generator-side converter 230. The generator-side converter 230 and the grid-side converter 240 use the same DC bus 250. The grid-side converter 240 is coupled to the grid 160 through a switch SW2 and the switch SW3.

In the present embodiment, the wind power generation system 200 is a doubly-fed wind power generation system. The doubly-fed generator 220 can be an asynchronous doubly-fed generator. The power outputted by the wind power generation system 200 to the grid 160 can be divided to two parts. One part is the power outputted directly from the stator winding 221. The other part is the power outputted from the rotor winding 222 by using the generator-side converter 230 and the grid-side converter 240. The electric energy outputted by the stator winding 221 is directly transmitted to the grid 160. The rotor winding 222 realizes an excitation by using the generator-side converter 230. When the wind speed changes such that the rotation speed of the doubly-fed generator 220 changes, the generator-side converter 230 changes the magnitude and the frequency of the excitation electromagnetic field by controlling the magnitude and the frequency of the excitation current of the rotor winding 222, such that the output voltage and frequency of the doubly-fed generator 220 is aligned with the those of the grid 160. Accordingly, the operation of the wind power generation system 200 with variable speed and constant frequency can be realized.

The advantage of the wind power generation system 200 (i.e. the doubly-fed wind power generation system) is that the cost of the doubly-fed generator 220 (e.g. asynchronous doubly-fed generator) thereof is low, and the doubly-fed generator 220 is easy to be maintained. The capacity of the generator-side converter 230 and the grid-side converter 240 only occupies 30% of the system capacity. As a result, the cost of the whole wind power generation module is lower than the conventional full power wind generation module. However, the loss of the asynchronous doubly-fed generator is larger under a low rotation speed. Under a low wind speed (e.g. lower than 6 meters per second) condition, the power generation efficiency of the wind power generation system 200 is lower.

Figure 3:
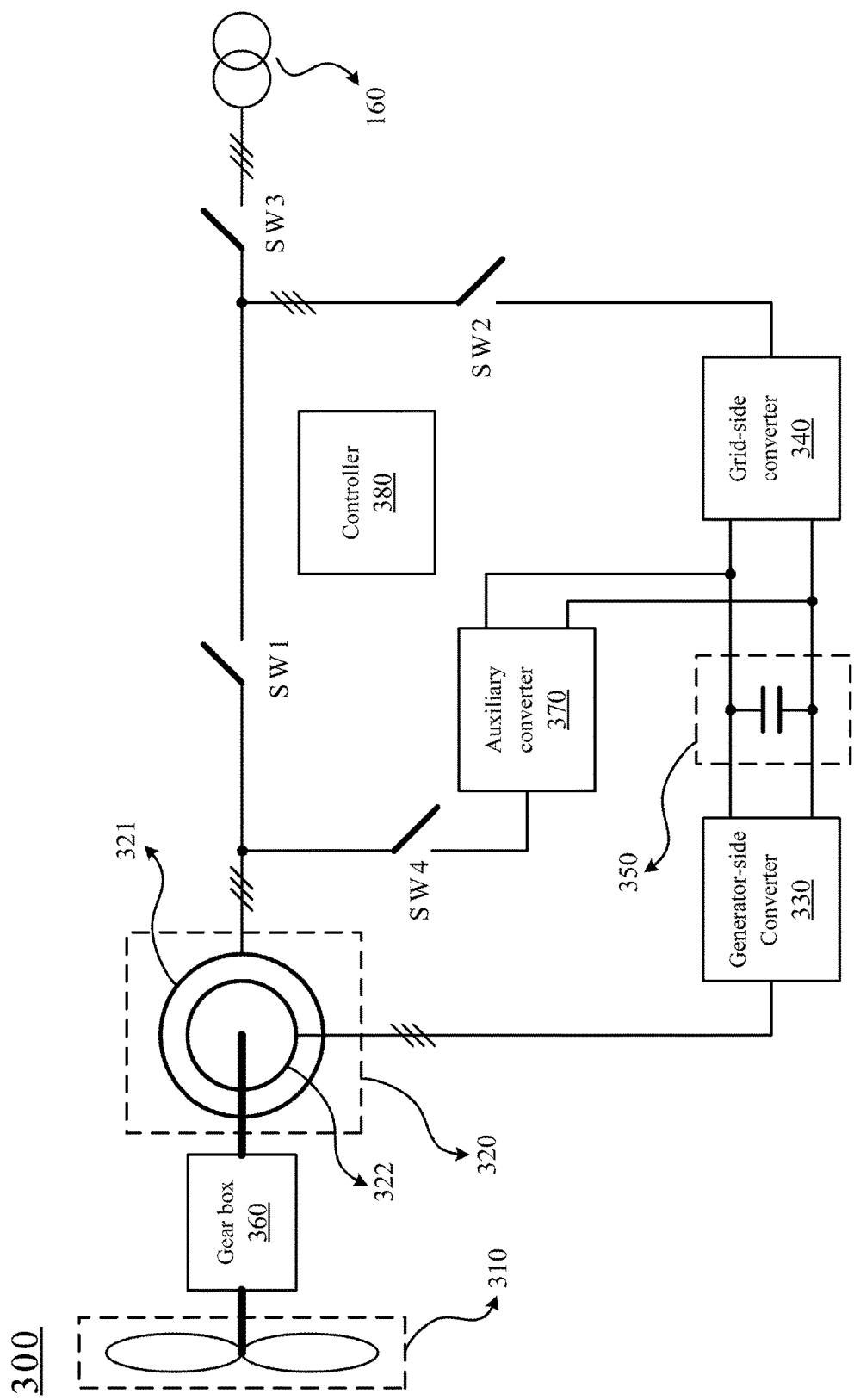
FIG. 3 is a diagram of a wind power generation system in an embodiment of the present disclosure.

FIG. 3 is a diagram of a wind power generation system 300 in an embodiment of the present disclosure. The wind power generation system 300 includes a fan 310, a doubly-fed generator 320, a generator-side converter 330, a grid-side converter 340, a DC bus 350, a gear box 360, an auxiliary converter 370 and a controller 380. Similarly, the fan 310 is coupled to the doubly-fed generator 320 through the gear box 360. The doubly-fed generator 320 includes a stator winding 321 and a rotor winding 322. The doubly-fed generator 320 can be an asynchronous doubly-fed generator. The stator winding 321 of the doubly-fed generator 320 is coupled to a grid 160 through a switch SW1 and a switch SW3. The rotor winding 322 of the doubly-fed generator 320 is coupled to the generator-side converter 330. The auxiliary converter 370 includes a first side and a second side. The first side of the auxiliary converter 370 is coupled to the stator winding 321 through a switch SW4. The second side of the auxiliary converter 370 is coupled between the generator-side converter 330 and the grid-side converter 340. The auxiliary converter 370, the generator-side converter 330 and the grid-side converter 340 use the same DC bus 350. The grid-side converter 340 is coupled to the grid 160 through a switch SW2 and the switch SW3. The controller 380 controls the switches SW1, SW2, SW3 and SW4 such that the wind power generation system 300 is operated in different operation modes. The detail description is illustrated in the paragraphs shown below.

Figure 4A:
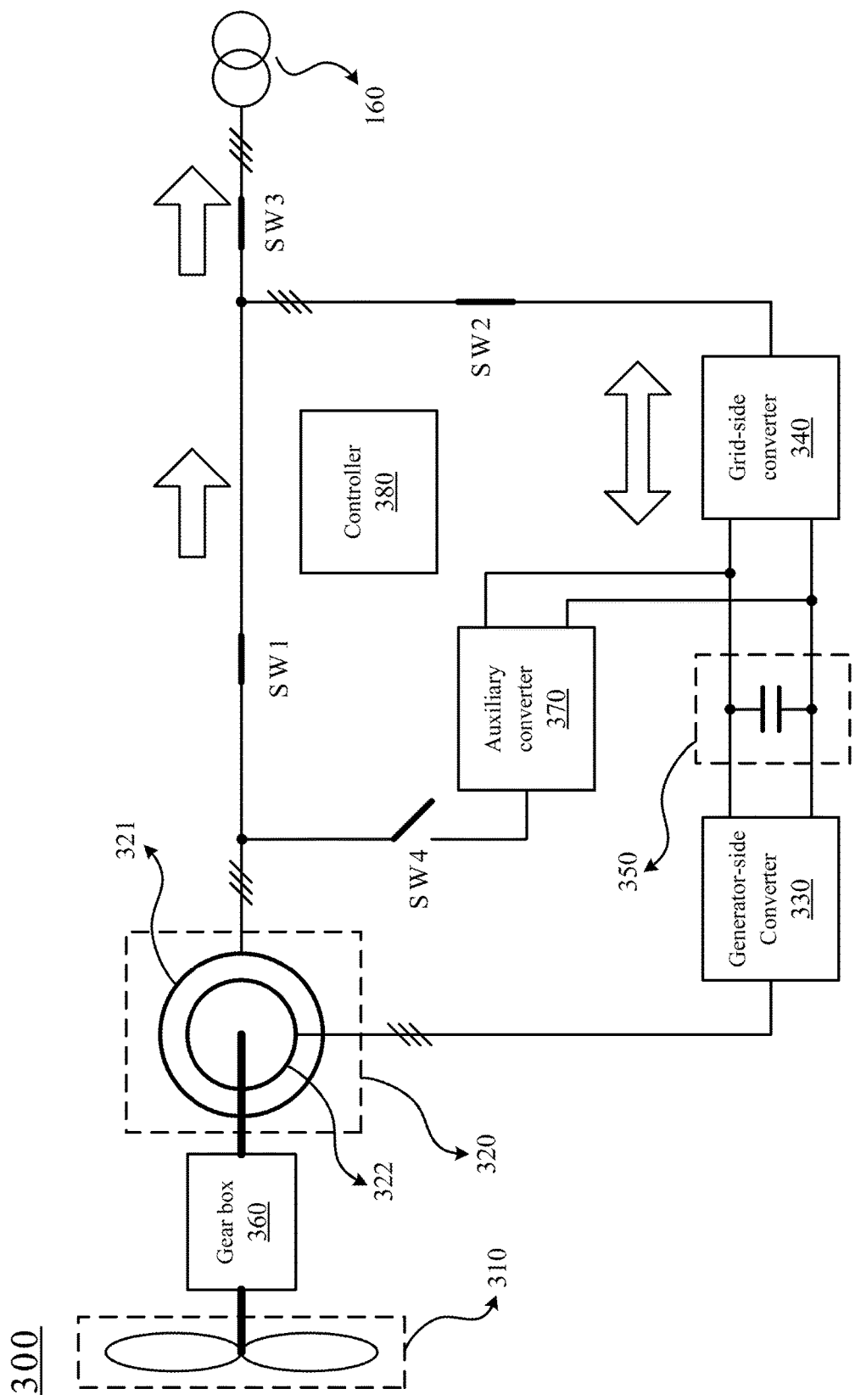
FIG. 4A is a diagram of the wind power generation system illustrated in FIG. 3 operated in a doubly-fed power generation mode.
Figure 4B:
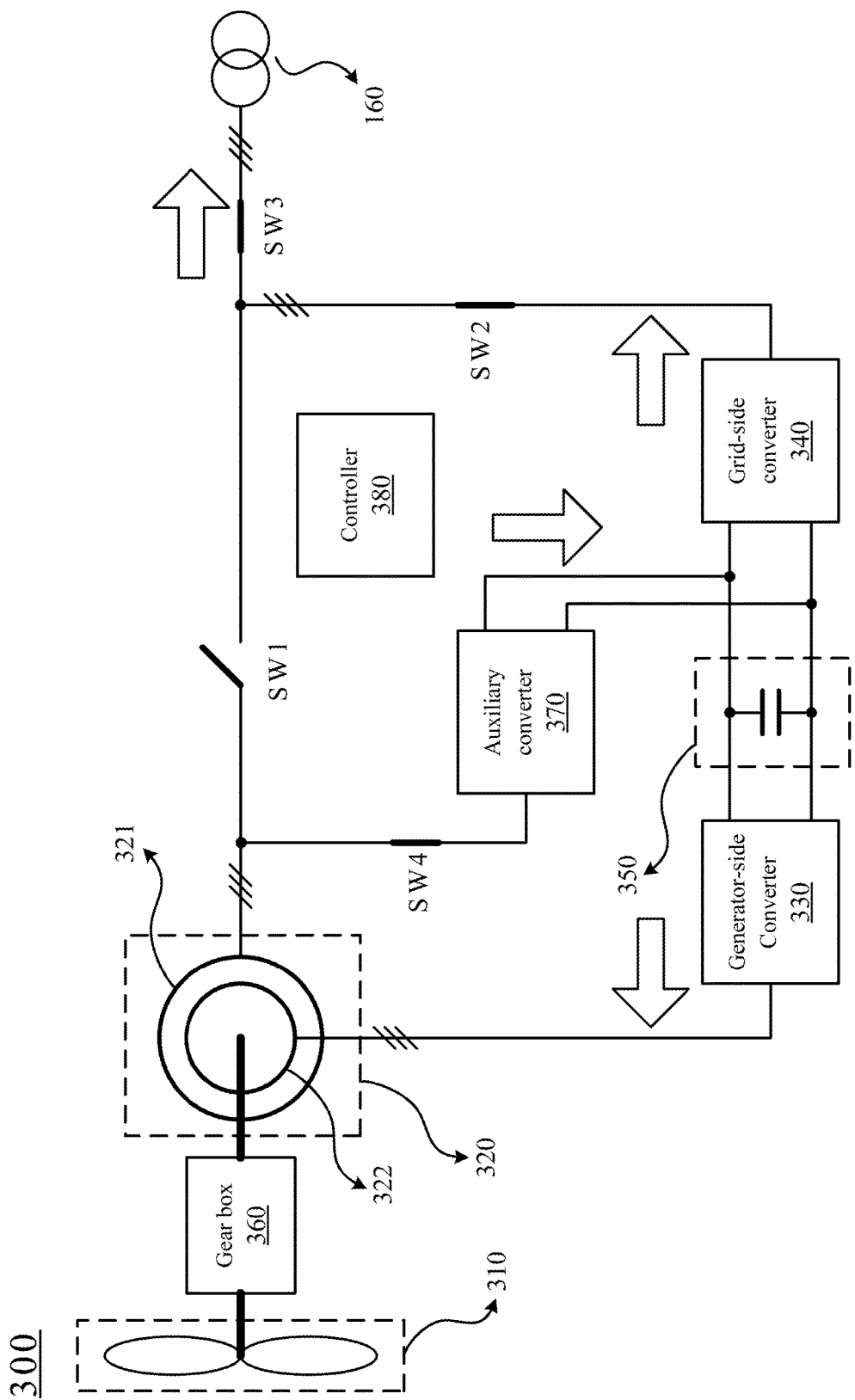
FIG. 4B is a diagram of the wind power generation system illustrated in FIG. 3 operated in a full power generation mode.
Figure 4C:
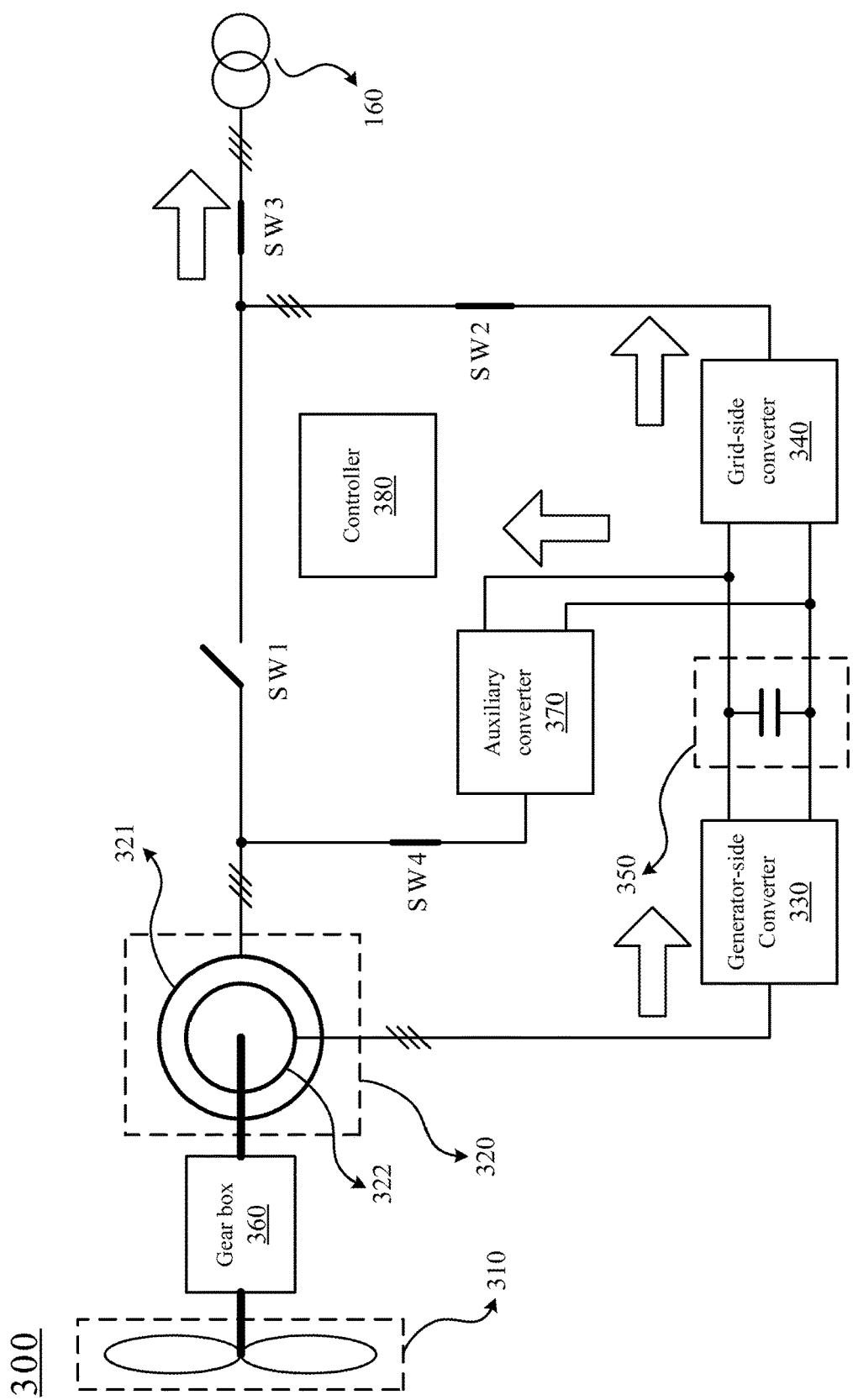
FIG. 4C is a diagram of the wind power generation system illustrated in FIG. 3 operated in another full power generation mode.

Now the reference is made to FIG. 4A, FIG. 4B and FIG. 4C at the same time. FIG. 4A is a diagram of the wind power generation system 300 illustrated in FIG. 3 operated in a doubly-fed power generation mode. FIG. 4B is a diagram of the wind power generation system 300 illustrated in FIG. 3 operated in a full power generation mode. FIG. 4C is a diagram of the wind power generation system 300 illustrated in FIG. 3 operated in another full power generation mode. In the present embodiment, when the wind speed is larger than a predetermined wind speed (e.g. 6 meters per second), the wind power generation system 300 is operated in the doubly-fed power generation mode as illustrated in FIG. 4A. The controller 380 controls the switches SW1, SW2 and SW3 to be conducted and the switch SW4 to be disconnected. Under such a condition, the auxiliary converter 370 is not involved in the conversion of the electric energy. In other words, the operation of the wind power generation system 300 is the same as the operation of the wind power generation system 200 illustrated in FIG. 2.

Substantially, when the wind power generation system 300 is operated in the doubly-fed power generation mode, the electric energy outputted by the stator winding 321 of the doubly-fed generator 320 is directly transmitted to the grid 160. The rotor winding 322 of the doubly-fed generator 320 is controlled by using the generator-side converter 330. More specifically, the generator-side converter 330 controls the rotation direction and the magnitude of the magnetic field of the rotor winding 322 of the doubly-fed generator 320 according to the rotation speed and the power of the doubly-fed generator 320. When the rotation speed of the doubly-fed generator 320 is larger than the synchronous rotation speed, the electric energy converted by the generator-side converter 330 and the grid-side converter 340 flows to the grid 160. When the rotation speed of the doubly-fed generator 320 is smaller than the synchronous rotation speed, the generator-side converter 330 and the grid-side converter 340 absorbs the electric energy from the grid 160. Besides, the grid-side converter 340 is used to stabilize the voltage of the DC bus 350. Accordingly, the operation of the wind power generation system 300 with variable speed and constant frequency can be realized when the wind speed is at a high speed (e.g. larger than or equal to 6 meters per second).

When the wind speed is lower than the predetermined wind speed (e.g. 6 meters per second), the wind power generation system 300 is operated in the full power generation mode, as illustrated in FIG. 4B and FIG. 4C. The controller 380 controls the switches SW2, SW3 and SW4 to be conducted and the switch SW1 to be disconnected. Under such a condition, the auxiliary converter 370 is involved in the conversion of the electric energy. Besides, according to the controlling method of the excitation, there can be two control methods of the wind power generation system 300 operated in the full power generation mode. One of the methods is to perform the controlling according to the rotor excitation (as illustrated in FIG. 4B), and the other one of the methods is to perform the controlling according to the stator excitation (as illustrated in FIG. 4C).

As illustrated in FIG. 4B, when the control method based on the rotor excitation is used in the wind power generation system 300, the auxiliary converter 370 and the grid-side converter 340 are used to convert the electric energy outputted from the stator winding 321 of the doubly-fed generator 320 and transmit the converted electric energy to the grid 160. The generator-side converter 330 is used to control the rotor winding 322 of the doubly-fed generator 320 to realize the excitation.

Substantially, under the condition of the rotor excitation control method, the auxiliary converter 370 adjusts an output power of the stator winding 321. The grid side converter 340 stabilizes the voltage of the DC bus 350. The generator-side converter 330 generates a rotor excitation current and transmits the rotor excitation current to the rotor winding 322 to realize the excitation. In other words, the auxiliary converter 370 and the grid-side converter 340 process the outputted electric energy from the stator winding 321. The power flows from the stator winding 321 through the auxiliary converter 370 and the grid-side converter 340 to the grid 160. The generator-side converter 330 absorbs part of the electric energy to adjust the rotor excitation current.

Figure 5:
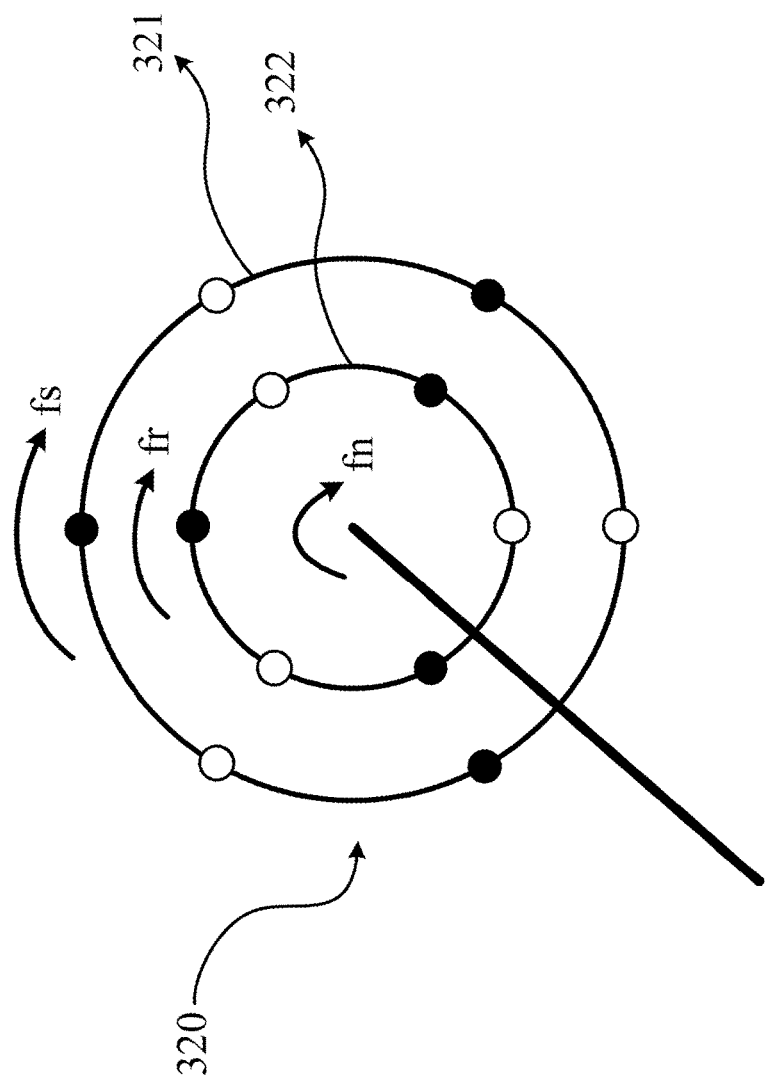
FIG. 5 is a diagram of the rotation of the magnetic field of the doubly fed generator in an embodiment of the present invention.

In an embodiment, the excitation realized by the generator-side converter 330 can be categorized into a direct-current excitation and an alternating-current excitation. Now the reference is made to FIG. 5 at the same time. FIG. 5 is a diagram of the rotation of the magnetic field of the doubly-fed generator 320 in an embodiment of the present invention. As illustrated in FIG. 5, the parameter fs stands for the rotation frequency of the stator electromagnetic filed generated by the stator winding 321. The parameter fr stands for the rotation frequency of the rotor electromagnetic filed generated by the rotor winding 322. The parameter fn stands for the mechanical rotation frequency of the doubly-fed generator 320, wherein fs=fr+fn and fn=n×P/60, in which n stands for the rotation speed (revolutions per minute; RPM) of the electrode axis of the doubly-fed generator 320 and P stands for the number of motor pole pairs.

In an embodiment, the generator-side converter 330 controls the rotor excitation current such that the rotation frequency fr of the rotor electromagnetic field generated by the rotor winding 322 is zero to realize the direct-current excitation. In other words, under the condition of the direct-current excitation, the rotation frequency fs of the stator electromagnetic field generated by the stator winding 321 is determined by the mechanical rotation frequency fn of the doubly-fed generator 320, which means that in such a condition, the operation of the doubly-fed generator 320 is similar to the synchronous generator.

In another embodiment, the generator-side converter 330 controls the rotor excitation current such that the rotation frequency fr of the rotor electromagnetic field generated by the rotor winding 322 is not zero to realize the alternating-current excitation. In other words, the rotation frequency fs of the stator electromagnetic field generated by the stator winding 321 under the condition of the alternating-current excitation is determined by the rotation frequency fr of the rotor electromagnetic field and the mechanical rotation frequency fn of the doubly-fed generator 320. More specifically, the rotation frequency fr of the rotor electromagnetic field changes according to the variation of the mechanical rotation frequency fn of the doubly-fed generator 320. Therefore, the rotation frequency fs of the stator electromagnetic filed can be a constant or a variable value.

On the other hand, as illustrated in FIG. 4C, when the control method based on the stator excitation is used in the wind power generation system 300, the generator-side converter 330 and the grid-side converter 340 are used to convert the electric energy outputted from the rotor winding 322 of the doubly-fed generator 320 and transmit the converted electric energy to the grid 160. The auxiliary converter is used to control the stator winding 321 of the doubly-fed generator 320 to realize the excitation.

Substantially, under the condition of the stator excitation control method, the generator-side converter 330 adjusts an output power of the rotor winding 322. The grid-side converter 340 stabilizes the voltage of the DC bus 350. The auxiliary converter 370 generates a stator excitation current and transmits the stator excitation current to the stator winding 321 to realize the excitation. In other words, the generator-side converter 330 and the grid side converter 340 process the outputted electric energy from the rotor winding 322. The power flows from the rotor winding 322 through the generator-side converter 330 and the grid-side converter 340 to the grid 160. The auxiliary converter 370 absorbs part of the electric energy to adjust the stator excitation current.

Similarly, the excitation realized by the auxiliary converter 370 can be categorized into a direct-current excitation and an alternating-current excitation. In an embodiment, the auxiliary converter 370 controls the stator excitation current such that the rotation frequency fs of the stator electromagnetic field generated by the stator winding 321 is zero to realize the direct-current excitation. In other words, the auxiliary converter 370 controls the direction of the stator electromagnetic field to be constant. Since fs=fr+fn, when fs=0, fr=−fn (the negative sign means that the direction is opposite). In other words, under the condition of the direct-current excitation, the rotation frequency fr of the rotor electromagnetic field generated by the rotor winding 322 is determined by the mechanical rotation frequency fn of the doubly-fed generator 320.

In another embodiment, the auxiliary converter 370 controls the stator excitation current such that the rotation frequency fs of the stator electromagnetic field generated by the stator winding 321 is not zero to realize the alternating-current excitation. In other words, the rotation frequency fr of the rotor electromagnetic field generated by the rotor winding 322 under the condition of the alternating-current excitation is determined by the rotation frequency fs of the stator electromagnetic field and the mechanical rotation frequency fn of the doubly-fed generator 320. More specifically, the rotation frequency fs of the stator electromagnetic field changes according to the variation of the mechanical rotation frequency fn of the doubly-fed generator 320. Therefore, the rotation frequency fr of the rotor electromagnetic filed can be a constant or a variable value.

It is appreciated that when the wind power generation system 300 is operated in the full power generation mode, the user can design the wind power generation system 300 according to the demand of the environment such that the wind power generation system 300 is controlled according to the rotor excitation or the stator excitation and realizes the direct-current excitation or the alternating-current excitation. The present invention is not limited thereto.

Through the above embodiment, the wind power generation system 300 can operate in the full power generation mode by using the auxiliary converter 370 when the wind speed is lower than the predetermined wind speed (e.g. 6 meters per second). The condition of lower power generation efficiency of the wind power generation system can be improved.

Figure 6A:
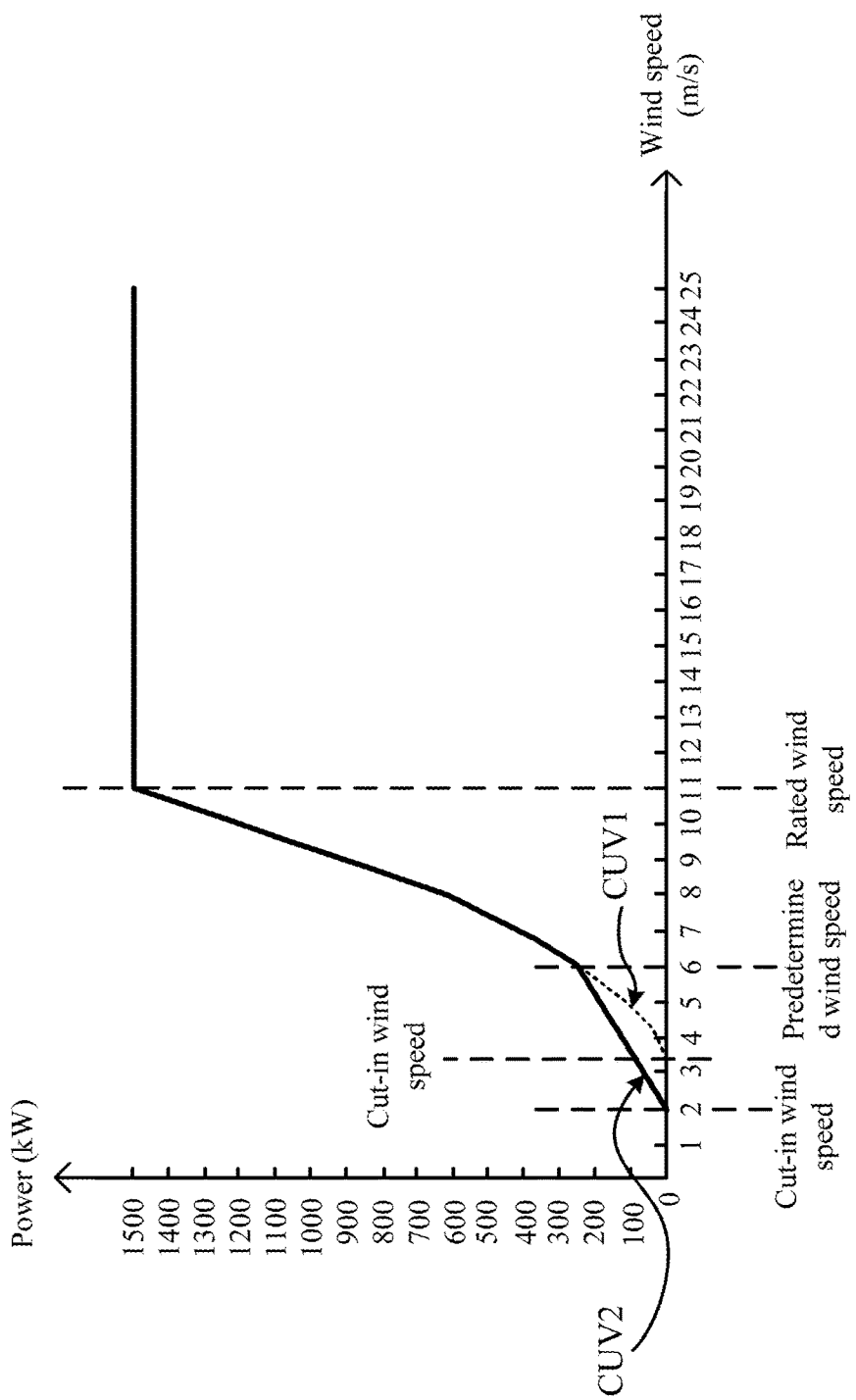
FIG. 6A is a diagram of the power curve of the wind power generation system under different wind speeds in an embodiment of the present invention.

FIG. 6A is a diagram of the power curve of the wind power generation system under different wind speeds in an embodiment of the present invention. The curve CUV1 stands for the power curve of the wind power generation system 200 and the curve CUV2 stands for the power curve of the wind power generation system 300. As illustrated in FIG. 6A, when the wind speed is larger than the predetermined wind speed, the operation of the wind power generation system 300 is similar to the doubly-fed wind power generation system (i.e. the wind power generation system 200). Therefore, during this section, the curves CUV1 and CUV2 are overlapped.

Besides, before the rated wind speed is reached, the wind power generation systems 200 and 300 can control the angle of the paddle facing the wind to make the power output as large as possible. After the rated wind speed is reached, the wind power generation systems 200 and 300 can control the angle of the paddle facing the wind to make the power output as a constant.

When the wind speed is smaller than the predetermined wind speed, the conversion efficiency of the wind power generation system 300 is greater than the conversion efficiency of the wind power generation system 200. Besides, the cut-in wind speed of the wind power generation system 300 is also smaller than the cut-in wind speed of the wind power generation system 200, which means that the wind power generation system 300 can be operated in the condition of a much lower wind speed. For example, for the doubly-fed wind power generation system that is able to produce 1.5 mega watts, the cut-in wind speed needed when the topology of the wind power generation system 200 is used is 3.4 meters per second. The cut-in wind speed needed when the topology of the wind power generation system 300 is used is only 2 meters per second.

Figure 6B:
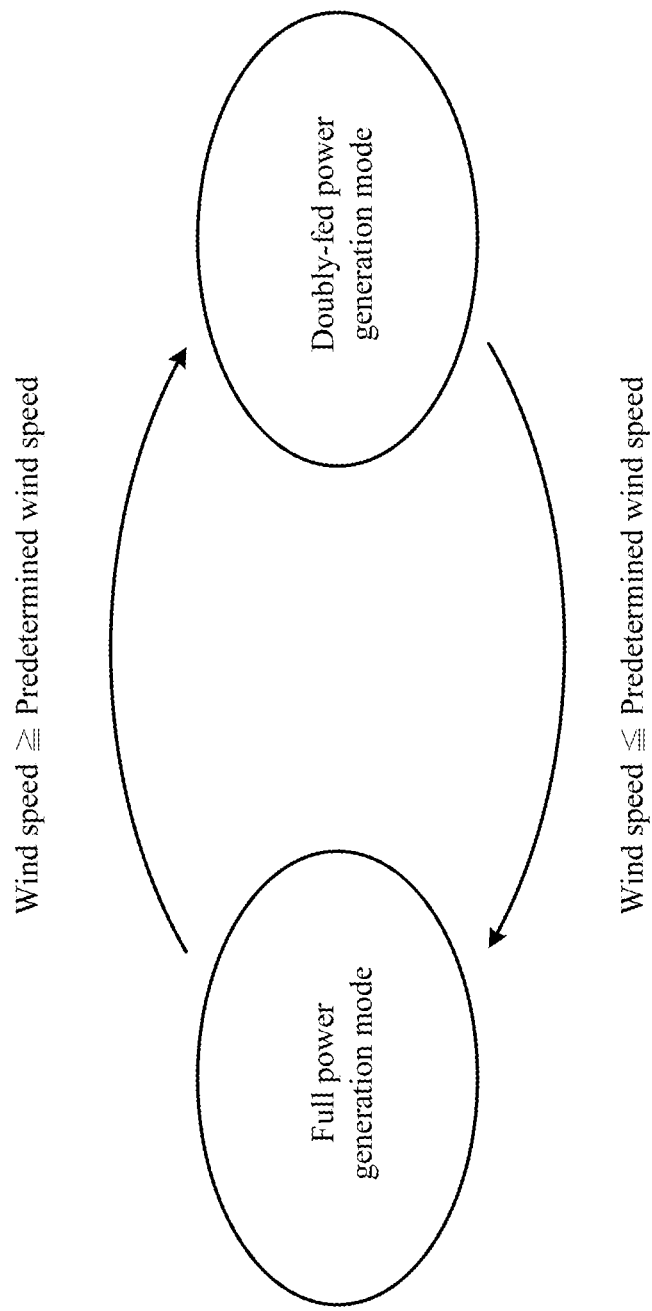
FIG. 6B is a diagram depicting the switching of the operation modes of the wind power generation system in an embodiment of the present invention.

FIG. 6B is a diagram depicting the switching of the operation modes of the wind power generation system 300 in an embodiment of the present invention. As illustrated in FIG. 6B, the relation of the wind speed of the fan 310 and the predetermined wind speed is used as the condition such that the wind power generation system 300 can be switched between different operation modes accordingly. When the wind speed of the fan 310 is smaller than the predetermined wind speed, the wind power generation system 300 can control the auxiliary converter 370 to operate by controlling the switches (e.g. controlling the switch SW4 to be conducted and the switch SW1 to be disconnected). Accordingly, the wind power generation system 300 is operated in the full power generation mode. When the wind speed of the fan 310 is larger than the predetermined wind speed, the wind power generation system 300 can stop the operation of the auxiliary converter 370 by controlling the switches (e.g. controlling the switch SW1 to be conducted and the switch SW4 to be disconnected). Accordingly, the wind power generation system 300 is operated in the doubly-fed power generation mode.

Substantially, the user can determine the value of the predetermined wind speed according to the factors such as the paddle length, the control mode and the design of the module of the generator. If the value of the predetermined wind speed is too low, the switching between the two power generation modes becomes too frequently. Besides, if the value of the predetermined wind speed is too high, the capacity of the auxiliary converter 370 and the switches increases. The cost of the whole modules of the generator increases as well.

It is worth to mention that the capacity of the auxiliary converter 370 additionally disposed in the wind power generation system 300 only occupies a small portion of the system capacity (e.g. 1/10~1/6). Comparing to the converter having the large capacity used in the full power wind power generation system 100, the cost increased in the wind power generation system 300 is not large. Nevertheless, the lower efficiency of the power generation of the wind power generation system 200 under the low wind speed condition can be greatly improved.

Figure 7A:
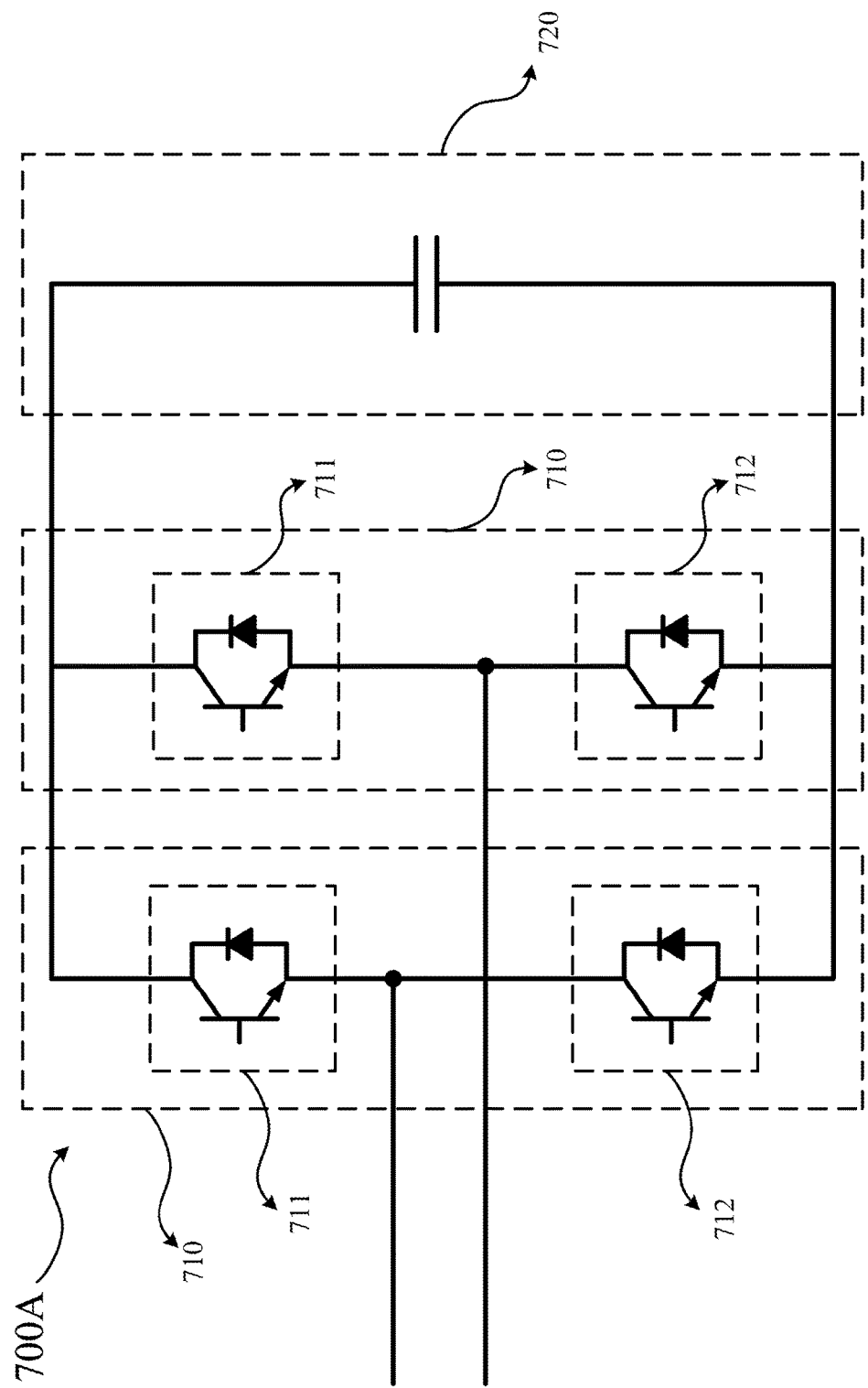
FIG. 7A is a diagram of the auxiliary converter in an embodiment of the present invention.
Figure 7B:
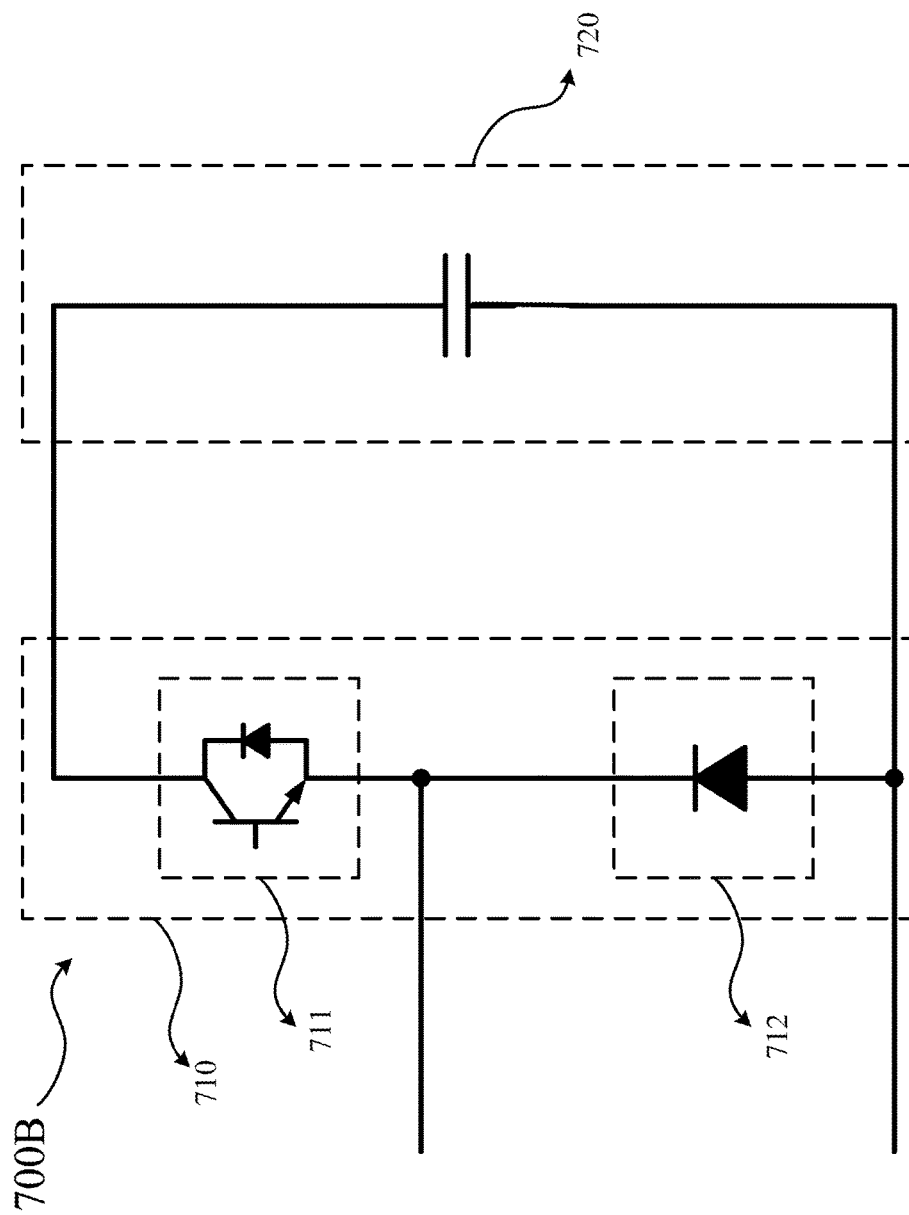
FIG. 7B is a diagram of another auxiliary converter in an embodiment of the present invention.
Figure 7C:
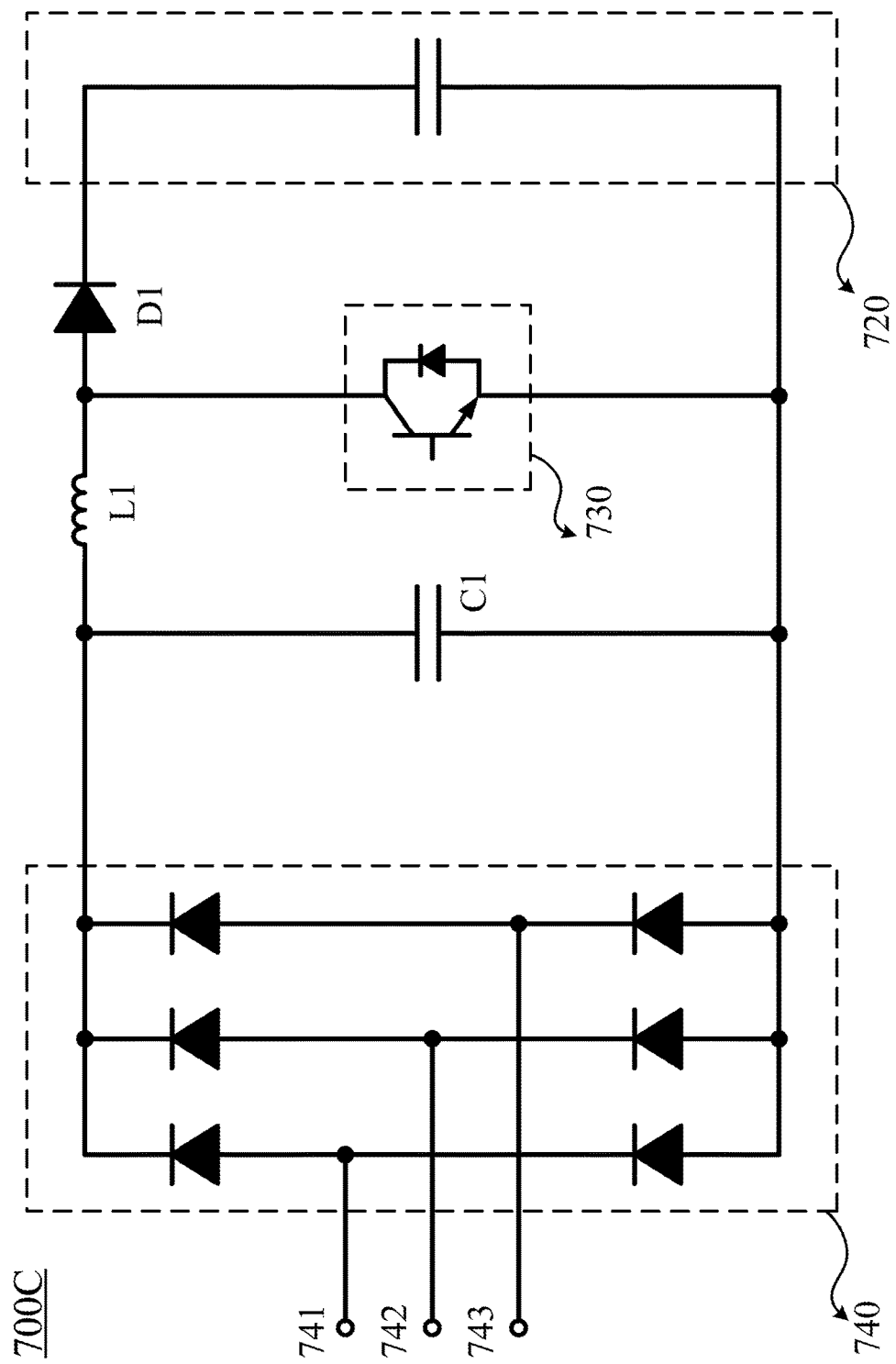
FIG. 7C is a diagram of another auxiliary converter in an embodiment of the present invention.

Now the reference is made to FIG. 7A, FIG. 7B and FIG. 7C. FIG. 7A is a diagram of the auxiliary converter 700A in an embodiment of the present invention. FIG. 7B is a diagram of another auxiliary converter 700B in an embodiment of the present invention. FIG. 7C is a diagram of another auxiliary converter 700C in an embodiment of the present invention. The auxiliary converters 700A, 700B and 700C can be used in the wind power generation system 300 illustrated in FIG. 3. However, the present embodiment is not limited thereto. It is appreciated that the auxiliary converters 700A, 700B and 700C can select the topology having a single energy flow direction or having dual energy flow directions according to the control method of the excitation. However, the present invention is not limited thereto.

As illustrated in FIG. 7A, the stator winding coupled by the auxiliary converter 700A includes a plurality of phase windings (not illustrated). The auxiliary converter 700A includes at least two bridges 710 connected in parallel. Each of the bridges 710 includes a first power semiconductor switch 711 and a second power semiconductor switch 712. The first power semiconductor switch 711 includes a first end and a second end. The first end of the first power semiconductor switch 711 is coupled to a first end (i.e. the positive end) of the DC bus 720. The second end of the first power semiconductor switch 711 is coupled to one phase winding of the phase windings. In other words, the bridges 710 are coupled to different phase windings respectively. The second power semiconductor switch 712 includes a first end and a second end. The first end of the second power semiconductor switch 712 is coupled to the second end of the first power semiconductor switch 711. The second end of the second power semiconductor switch 712 is coupled to the second end (i.e. the negative end) of the DC bus 720.

In an embodiment, each of the first and the second power semiconductor switches 711 and 712 is a fully-controlled switch element or a diode element. When one of the first and the second power semiconductor switches 711 and 712 is the diode element, the auxiliary converter 700A is the topology with the single direction flow. Relatively, when both of the first and the second power semiconductor switches 711 and 712 are the fully-controlled switch elements, the auxiliary converter 700A is the topology with the dual direction flow. In the present embodiment, the first and the second power semiconductor switches 711 and 712 are both the fully-controlled switch elements. However, the present embodiment is not limited thereto. It is appreciated that, the auxiliary converter 700A illustrated in FIG. 7A is two-phase and can be expanded to three-phase, which means that there are three bridges each corresponding connected to one phase winding of the stator winding, As illustrated in FIG. 7B, the auxiliary converter 700B includes a first power semiconductor switch 711 and a second power semiconductor switch 712. The first end of the first power semiconductor switch 711 is coupled to a first end (i.e. the positive end) of the DC bus 720. The second end of the first power semiconductor switch 711 is coupled to a first phase winding (not illustrated) of the stator winding. The second power semiconductor switch 712 includes a first end and a second end. The first end of the second power semiconductor switch 712 is coupled to the second end of the first power semiconductor switch 711. The second end of the second power semiconductor switch 712 is coupled to the second end (i.e. the negative end) of the DC bus 720 and a second phase winding (not illustrated) of the stator winding.

Similarly, each of the first and the second power semiconductor switches 711 and 712 is a fully-controlled switch element or a diode element. In the present embodiment, the first power semiconductor switch 711 is a fully-controlled switch element and the second power semiconductor switch 712 is a diode element. However, the present embodiment is not limited thereto.

As illustrated in FIG. 7C, the stator winding coupled by the auxiliary converter 700C is a three-phase winding (not illustrated), which means that the stator winding includes a first phase winding, a second phase winding and a third phase winding. The auxiliary converter 700C includes a diode D1, an insulated gate bipolar transistor (IGBT) 730, an inductor L1, a capacitor C1 and a three-phase rectifier 740. The diode D1 includes an anode and a cathode. The cathode is coupled to the first end (i.e. the positive end) of the DC bus 720. The IGBT 730 includes a first end and a second end. The first end of the IGBT 730 is coupled to the anode. The second end of the IGBT 730 is coupled to the second end (i.e. the negative end) of the DC bus 720. The inductor L1 includes a first end and a second end. The second end of the inductor L1 is coupled to the first end of the IGBT 730. The capacitor C1 includes a first end and a second end. The first end of the capacitor C1 is coupled to the first end of the inductor L1. The second end of the capacitor C1 is coupled to the second end of the IGBT 730. The three-phase rectifier circuit 740 is coupled to the first end and the second end of the capacitor C1. The three-phase rectifier circuit 740 includes a first input end 741, a second input end 742 and a third input end 743 coupled to the first phase winding, the second phase winding and the third phase winding of the stator windings respectively.

Figure 8:
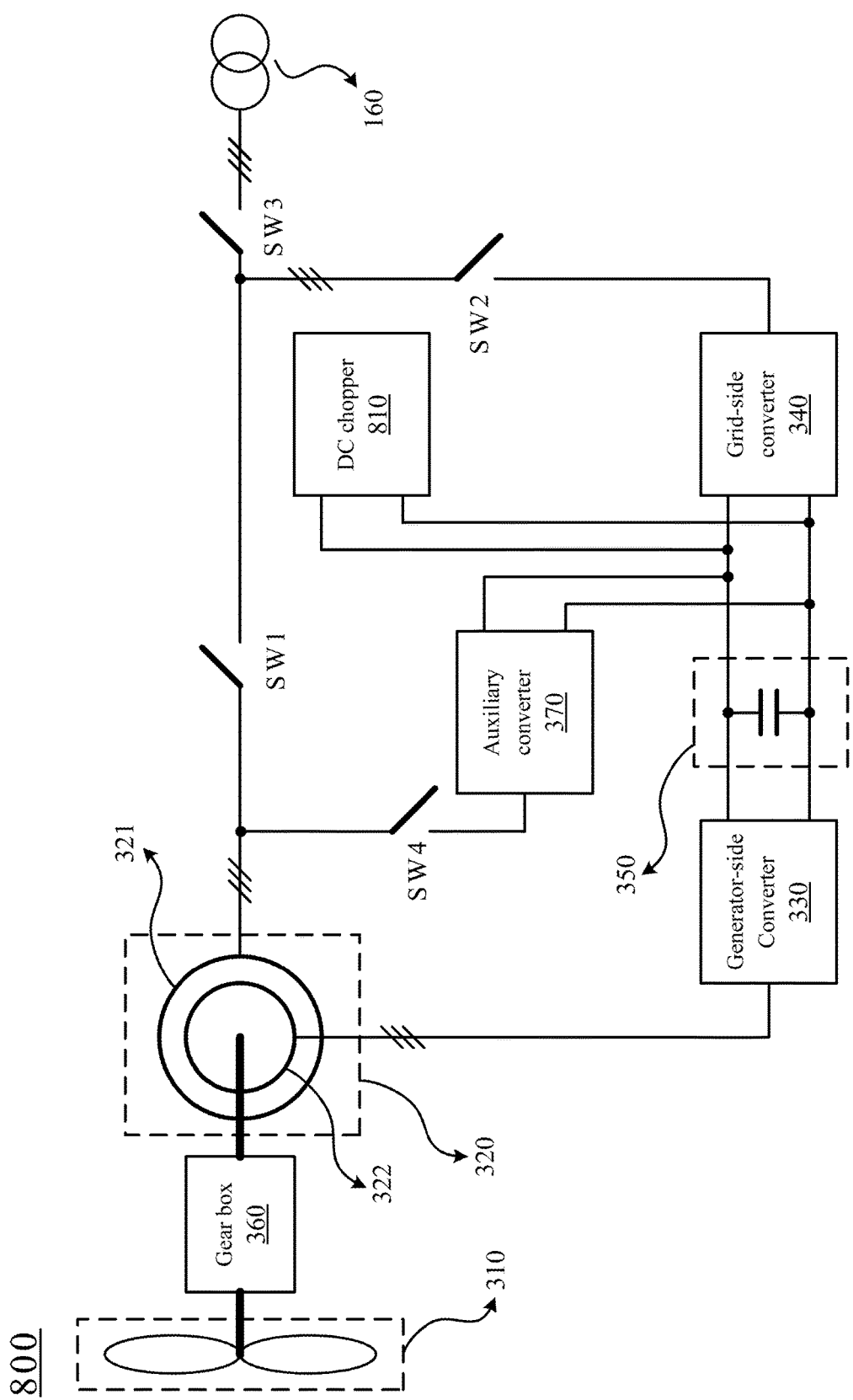
FIG. 8 is diagram of a wind power generation system in the third embodiment of the present invention.

FIG. 8 is diagram of a wind power generation system 800 in the third embodiment of the present invention. In the present embodiment, the wind power generation system 800 further includes a DC chopper 810. The DC chopper 810, the generator-side converter 330, the grid-side converter 340 and the auxiliary converter 370 are connected to the same DC bus 350. The DC chopper 810 solves problem of the variation of the DC bus voltage generated due to the unbalance energy when the grid 160 malfunctions to realize the function of the failure ride through (FRT).

Figure 9:
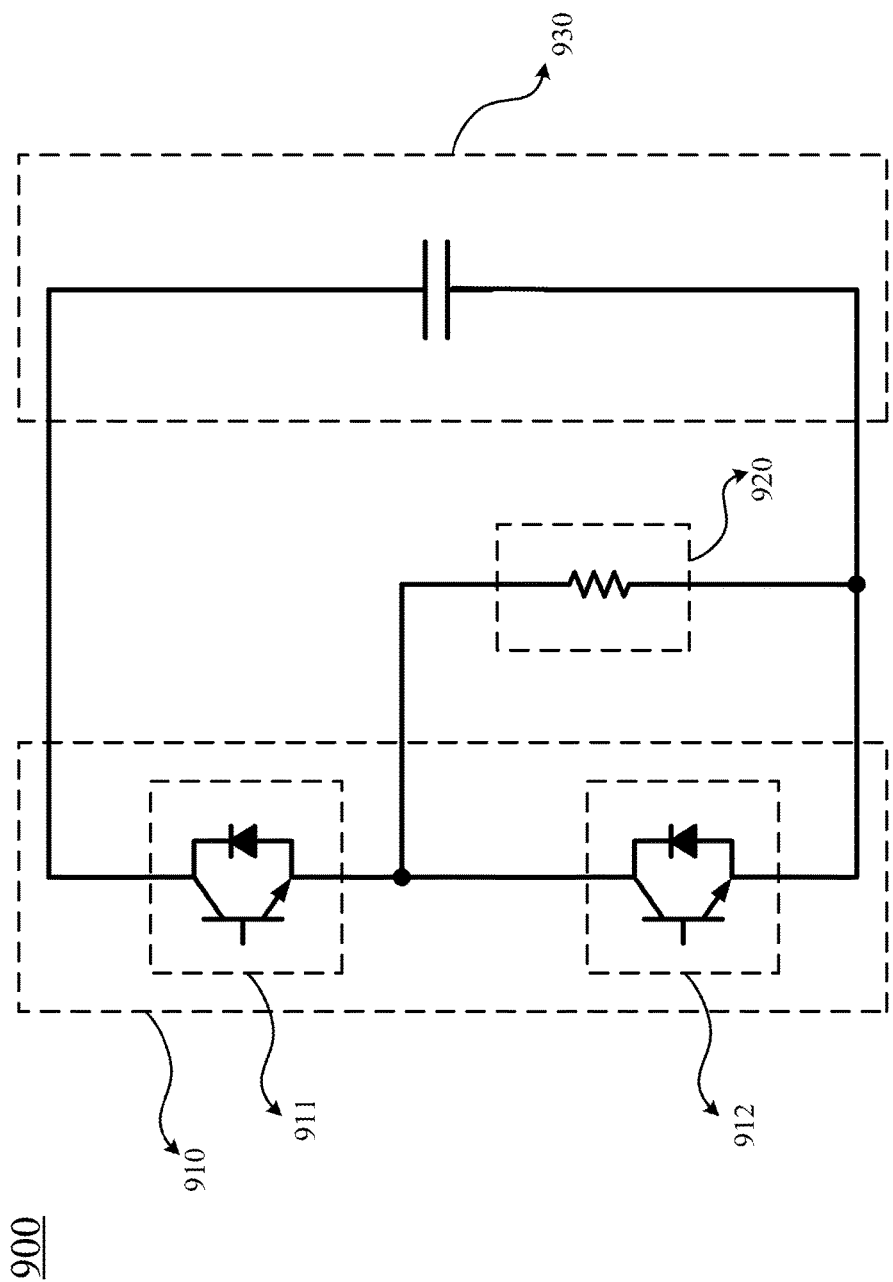
FIG. 9 is a diagram of a DC chopper in an embodiment of the present invention.

Now the reference is made to FIG. 9 together with FIG. 8. FIG. 9 is a diagram of a DC chopper 900 in an embodiment of the present invention. The DC chopper 900 can be used in the wind power generation system 800 illustrated in FIG. 8. However, the present embodiment is not limited thereto. The DC chopper 900 includes a DC chopper bridge 910 and an energy dissipating resistor 920. The chopper bridge 910 includes a first power semiconductor switch 911 and a second power semiconductor switch 912. The first end of the first power semiconductor switch 911 is coupled to the positive DC bus end of the bus 930. The second end of the power semiconductor switch 912 is coupled to the first end of the second power semiconductor switch 912. The second end of the second power semiconductor switch 912 is coupled to the negative bus end of the DC bus 930.

In an embodiment, one end of the energy dissipating resistor 920 is coupled to the middle point of the DC chopper bridge 910 (i.e. between the first and the second power semiconductor switches 911 and 912). The other end of the energy dissipating resistor 920 is coupled to either the positive bus end or the negative bus end of the DC bus 930. Besides, each of the first and the second power semiconductor switches 911 and 912 is a fully-controlled switch element or a diode element, wherein one of the first and the second power semiconductor switches 911 and 912 is the fully-controlled switch element. In the present embodiment, both of the first and the second power semiconductor switches 911 and 912 are fully-controlled switch elements, and the other end of the energy dissipating resistor 920 is coupled to the negative bus end of the DC bus 930. However, the present embodiment is not limited thereto.

To summarize, in the wind power generation system, the wind power generation system can be operated in the full power generation mode when the wind speed is low without increasing much cost by disposing an auxiliary converter with a small capacity to further greatly improve the lower efficiency of the power generation of the doubly-fed wind power generation system under the low wind speed condition.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wind power generation system, comprising:
    a doubly-fed generator comprising
        a stator winding and
        a rotor winding;
    a DC bus;
    a generator-side converter comprising a first side coupled to the rotor winding and a second side coupled to the DC bus;
    a grid-side converter comprising a first side coupled to a grid and a second side coupled to the DC bus;
    an auxiliary converter comprising
        a first side and
        a second side coupled to the DC bus;
    a first switch comprising a first end coupled to the stator winding and a second end coupled to the first side of the auxiliary converter;
    a second switch comprising a first end coupled to the first end of the first switch and a second end coupled to the grid; and
    a controller configured to control the first switch and the second switch,
    wherein when a wind speed is smaller than a predetermined wind speed, the controller controls the first switch to be turned on and the second switch to be disconnected to make the wind power generation system be operated in a full power generation mode, wherein the auxiliary converter is connected so as to be involved in conversion of electric energy to or from the stator winding, and
    when the wind speed is larger than or equal to the predetermined wind speed, the controller controls the first switch to be disconnected and the second switch to be turned on to make the wind power generation system be operated in a doubly-fed power generation mode, wherein the auxiliary converter is disconnected and thus is not involved in the conversion of electric energy.

2. The wind power generation system of claim 1, wherein when the wind speed is smaller than the predetermined wind speed, the auxiliary converter and the grid-side converter convert an electric energy outputted by the stator winding and transmit the converted electric energy to the grid, and the generator-side converter controls the rotor winding to realize an excitation, wherein the auxiliary converter adjusts an output power of the stator winding, the grid-side converter stabilizes a voltage of the DC bus and the generator-side converter generates a rotor excitation current and transmits the rotor excitation current to the rotor winding to realize the excitation.

3. The wind power generation system of claim 2, wherein the generator-side converter controls the rotor excitation current such that a rotation frequency of a rotor electromagnetic field generated by the rotor winding is zero to realize a direct-current excitation, wherein the rotation frequency of the stator electromagnetic field generated by the stator winding is determined by a mechanical rotation frequency of the doubly-fed generator.

4. The wind power generation system of claim 2, wherein the generator-side converter controls the rotor excitation current such that a rotation frequency of a rotor electromagnetic field generated by the rotor winding is not zero to realize an alternating-current excitation, wherein a rotation frequency of a stator electromagnetic field generated by the stator winding is determined by the rotation frequency of the rotor electromagnetic field and a mechanical rotation frequency of the doubly-fed generator.

5. The wind power generation system of claim 1, wherein when the wind speed is smaller than the predetermined wind speed, the generator-side converter and the grid-side converter convert an electric energy outputted by the rotor winding and transmit the converted electric energy to the grid, and the auxiliary converter controls the stator winding to realize an excitation, wherein the generator-side converter adjusts an output power of the rotor winding, the grid-side converter stabilizes a voltage of the DC bus and the auxiliary converter generates a stator excitation current and transmits the stator excitation current to the stator winding to realize the excitation.

6. The wind power generation system of claim 5, wherein the auxiliary converter controls the stator excitation current such that a rotation frequency of a stator electromagnetic field generated by the stator winding is zero to realize a direct-current excitation, wherein a rotation frequency of a rotor electromagnetic field generated by the rotor winding is determined by a mechanical rotation frequency of the doubly-fed generator.

7. The wind power generation system of claim 5, wherein the auxiliary converter controls the stator excitation current such that a rotation frequency of a stator electromagnetic field generated by the stator winding is not zero to realize an alternating-current excitation, wherein a rotation frequency of a rotor electromagnetic field generated by the rotor winding is determined by the rotation frequency of the stator electromagnetic field and a mechanical rotation frequency of the doubly-fed generator.

8. The wind power generation system of claim 1, wherein the auxiliary converter comprises:
    a first power semiconductor switch comprising:
        a first end coupled to a first end of the DC bus; and
        a second end coupled to a first phase winding of the stator winding; and
    a second power semiconductor switch comprising:
        a first end coupled to the second end of the first power semiconductor switch; and
        a second end coupled to a second end of the DC bus and a second phase winding of the stator winding.

9. The wind power generation system of claim 1, wherein the stator winding comprises a plurality of phase windings, and the auxiliary converter comprises at least two bridges connected in parallel, and each of the bridges comprises:
  a first power semiconductor switch comprising:
    a first end coupled to a first end of the DC bus; and
    a second end coupled to one of the phase windings; and
  a second power semiconductor switch comprising:
    a first end coupled to the second end of the first power semiconductor switch; and
    a second end coupled to a second end of the DC bus.

10. The wind power generation system of claim 1, wherein the stator winding further comprises a first phase winding, a second phase winding and a third phase winding; and the auxiliary converter comprises:
  a diode comprises:
    an anode; and
    a cathode coupled to a first end of the DC bus;
  an insulated gate bipolar transistor (IGBT) comprising:
    a first end coupled to the anode; and
    a second end coupled to a second end of the DC bus;
  an inductor comprising:
    a first end; and
    a second end coupled to the first end of the IGBT;
  a capacitor comprising:
    a first end coupled to the first end of the inductor; and
    a second end coupled to the second end of the IGBT; and
  a three-phase rectifier circuit coupled to the first end and the second end of the capacitor, and the three-phase rectifier circuit comprises a first input end, a second input end and a third input end coupled to the first phase winding, the second phase winding and the third phase winding respectively.

11. A control method used in the wind power generation system of claim 1, wherein controlling the wind power generation system to be operated in the full power generation mode when the wind speed is smaller than the predetermined wind speed further comprises steps of:
  converting an electric energy outputted by the stator winding by using the auxiliary converter and the grid-side converter;
  transmitting the converted electric energy to the grid;
  realizing an excitation by generating a rotor excitation current and transmitting the rotor excitation current to the rotor winding by the generator-side converter;
  adjusting an output power of the stator winding by using the auxiliary converter; and
  stabilizing a voltage of the DC bus by using the grid-side converter.

12. The control method of claim 11, wherein the step of realizing the excitation by generating the rotor excitation current and transmitting the rotor excitation current to the rotor winding by the generator-side converter further comprises:
  controlling the rotor excitation current by the generator-side converter such that a rotation frequency of a rotor electromagnetic field generated by the rotor winding is zero to realize a direct-current excitation, wherein a rotation frequency of a stator electromagnetic field generated by the stator winding is determined by a mechanical rotation frequency of the doubly-fed generator.

13. The control method of claim 11, wherein the step of realizing the excitation by generating a rotor excitation current and transmitting the rotor excitation current to the rotor winding by the generator-side converter further comprises:
  controlling the rotor excitation current by the generator-side converter such that a rotation frequency of a rotor electromagnetic field generated by the rotor winding is not zero to realize an alternating-current excitation, wherein a rotation frequency of a stator electromagnetic field generated by the stator winding is determined by the rotation frequency of the rotor electromagnetic field and a mechanical rotation frequency of the doubly-fed generator.

14. A control method used in the wind power generation system of claim 1, wherein controlling the wind power generation system to be operated in the full power generation mode when the wind speed is smaller than the predetermined wind speed further comprises steps of:
  converting an electric energy outputted by the rotor winding by the generator-side converter and the grid-side converter;
  transmitting the converted electric energy to the grid;
  generating a stator excitation current and transmitting the stator excitation current to the stator winding to realize an excitation by the auxiliary converter;
  adjusting an output power of the rotor winding by using the generator-side converter; and
  stabilizing a voltage of the DC bus by using the grid-side converter.

15. The control method of claim 14, wherein the step of generating the stator excitation current and transmitting the stator excitation current to the stator winding to realize an excitation by the auxiliary converter further comprises:
  controlling the stator excitation current by the auxiliary converter such that a rotation frequency of a stator electromagnetic field generated by the stator winding is zero to realize a direct-current excitation, wherein a rotation frequency of a rotor electromagnetic field generated by the rotor winding is determined by a mechanical rotation frequency of the doubly-fed generator.

16. The control method of claim 14, wherein the step of generating a stator excitation current and transmitting the stator excitation current to the stator winding to realize an excitation by the auxiliary converter further comprises:
  controlling the stator excitation current by the auxiliary converter such that a rotation frequency of a stator electromagnetic field generated by the stator winding is not zero to realize an alternating-current excitation, wherein a rotation frequency of a rotor electromagnetic field generated by the rotor winding is determined by the rotation frequency of the stator electromagnetic field and a mechanical rotation frequency of the doubly-fed generator.

* * * * *